US011850768B2

(12) United States Patent
Lin et al.

(10) Patent No.: US 11,850,768 B2
(45) Date of Patent: Dec. 26, 2023

(54) METHOD FOR MANUFACTURING TRANSPARENT HEAT-INSULATION BUILDING MATERIAL BASED ON WASTE WOOD

(71) Applicant: ZHEJIANG PENGYUAN NEW MATERIAL TECHNOLOGY GROUP CO., LTD., Zhejiang (CN)

(72) Inventors: Weiqiang Lin, Zhejiang (CN); Yong Gao, Zhejiang (CN); Hangli Zhu, Zhejiang (CN); Fujun Zheng, Zhejiang (CN); Shouyuan Li, Zhejiang (CN)

(73) Assignee: ZHEJIANG PENGYUAN NEW MATERIAL TECHNOLOGY GROUP CO., LTD., Zhejiang (CN)

( * ) Notice: Subject to any disclaimer, the term of this patent is extended or adjusted under 35 U.S.C. 154(b) by 341 days.

(21) Appl. No.: 17/359,625

(22) Filed: Jun. 27, 2021

(65) Prior Publication Data
US 2022/0080616 A1  Mar. 17, 2022

(30) Foreign Application Priority Data

Sep. 11, 2020  (CN) .......................... 202010955998.6

(51) Int. Cl.
| | | |
|---|---|---|
| *B27K 3/52* | (2006.01) | |
| *B27K 3/02* | (2006.01) | |
| *B27K 5/00* | (2006.01) | |
| *B27K 5/02* | (2006.01) | |
| *B27M 1/02* | (2006.01) | |
| *B27K 3/10* | (2006.01) | |
| *B82Y 30/00* | (2011.01) | |

(52) U.S. Cl.
CPC .............. *B27K 3/52* (2013.01); *B27K 3/0214* (2013.01); *B27K 3/10* (2013.01); *B27K 5/0075* (2013.01); *B27K 5/0085* (2013.01); *B27K 5/02* (2013.01); *B27M 1/02* (2013.01); *B82Y 30/00* (2013.01)

(58) Field of Classification Search
CPC ........ B27K 3/007; B27K 3/02; B27K 3/0214; B27K 3/025; B27K 3/0278; B27K 3/08; B27K 3/10; B27K 3/15; B27K 3/28; B27K 3/365; B27K 5/001; B27K 5/007; B27K 5/0075; B27K 5/0085; B27K 5/009; B27K 5/04; B27K 2200/10; B27K 2240/10; B27K 2240/60
See application file for complete search history.

(56) References Cited

U.S. PATENT DOCUMENTS 11,602,872 B2 *  3/2023  Li ............................ B27K 5/02
2020/0023546 A1    1/2020  Li et al.

FOREIGN PATENT DOCUMENTS

| CN | 105171866 | | 12/2015 | | |
|---|---|---|---|---|---|
| CN | 108527572 | A * | 9/2018 | ........... | B27K 3/0207 |
| CN | 112140264 | A * | 12/2020 | ........... | B27K 3/0207 |
| WO | WO-2018182497 | A1 * | 10/2018 | ........... | B27K 3/0207 |

OTHER PUBLICATIONS

A.H. Tullo, "Making wood last forever with acetylation: companies like Eastman Chemical and Accsys are marketing chemically modified, long-lasting wood," C&E News, vol. 90, Issue 32, Aug. 6, 2012. Retrieved from https://cen.acs.org/articles/90/i32/Making-Wood-Last-Forever-Acetylation.html>. 4 pages. (Year: 2012).*
Li et al., "Towards centimeter thick transparent wood through interface manipulation," J. Mater. Chem. A, 2018, 6, 1094-1101. (Year : 2018).*
Qiu et al., "Transparent wood bearing a shielding effect to infrared heat and ultraviolet via incorporation of modified antimony-doped tin oxide nanoparticles," Composites Science and Technology 172 (2019) 43-48. (Year: 2019).*
Li et al., "A green stem-modified delignification method to prepare low-lignin delignified wood for thick, large highly transparent wood composites," Journal of Materials Research, vol. 34, Issue 6, Mar. 28, 2019, 932-940. (Year: 2019).*
Wu et al., "Effect of H2O2 bleaching treatment on the properties of finished transparent wood," Polymers 2019, 11, 776. (Year: 2019).*
S. Wild, "Transparent wood: the building material of the future?" Horizon: The EU Research & Innovation Magazine, Nov. 26, 2019. Retrieved from <https://ec.europa.eu/research-and-innovation/en/horizon-magazine/transparent-wood-building-material-future.html> on Jul. 28, 2023. 9 pages. (Year: 2019).*
A. Androff and R. Westover, "Transparent wood could be the window of the future," U.S. Dept. of Agriculture, Oct. 1, 2020. Retrieved from <https://www.usda.gov/media/blog/2020/10/01/transparent-wood-could-be-window -future.html> on Jul. 28, 2023. 4 pages. (Year: 2020).*

(Continued)

*Primary Examiner* — William P Fletcher, III
(74) *Attorney, Agent, or Firm* — COOPER LEGAL GROUP, LLC

(57) ABSTRACT

A method for manufacturing a transparent heat-insulation building material from waste wood is provided. The method includes the following steps of: step S1, wood pretreatment, drying immersing, heating, adding a complexing agent solution, stirring, then drying the wood; step S2, wood acetylation treatment, loading the wood into a pressure vessel, adding acetylation fluid, reducing the pressure, and then pressurizing and raising a temperature; step S3, resin impregnating, adding a methyl methacrylate monomer solution and heating it, adding the methyl methacrylate monomer and benzoyl peroxide, bleaching the wood by hydrogen peroxide, and placing them in a vacuum permeator to allow the prepolymer liquid to penetrate into the wood and collecting the prepolymer liquid; and step S4, hot press molding polymerizing the wood in an oven and sleeving it into a heat press molding to obtain a densified wood.

8 Claims, No Drawings

(56) References Cited

OTHER PUBLICATIONS

Kumar et al., "Delignified wood from understanding the hierarchically aligned cellulosic structures to creating novel functional materials: a review," Adv. Sustainable Syst. 2021, 5, 2000251. (Year: 2021).*

Foster et al., "Mechanics, optics, and thermodynamics of water transport in chemically modified transparent wood composites," Composite Science and Technology 208 (2021) 108737. (Year: 2021).*

Yuanyuan Li, et al.; Journal of Materials Chemistry A; Royal Society of Chemistry; "Towards centimeter thick transparent wood through interface manipulation"; J. Mater. Chem. A, 2018, 6, 1094-1101; Dec. 13, 2017; 8 Pgs.

Zhi Qiu, et al.; Composites Science and Technology 172 (2019) 43-48; https://www.elsevier.com/locate/compscitech; "Transparent wood bearing a shielding effect to infrared heat and ultraviolet via incorporation of modified antimony-doped tin oxide nanoparticles"; 6 Pgs.

* cited by examiner

METHOD FOR MANUFACTURING TRANSPARENT HEAT-INSULATION BUILDING MATERIAL BASED ON WASTE WOOD

CROSS-REFERENCE TO RELATED APPLICATION

The present application is based on and claims the priority benefits of China application No. 202010955998.6, filed on Sep. 11, 2020. The entirety of the above-mentioned patent application is hereby incorporated by reference herein and made a part of this specification.

BACKGROUND

Technical Field

This application relates to the technical field of building material processing, and more particularly, to a method for manufacturing a transparent heat-insulation building material based on waste wood.

Description of Related Art

Along with the rapid development of economy and the continuous improvement of social living standard, there are more and more demands for wood in various industries, and many products need to be made of wood materials, so that too many trees are felled, the forest area is continuously reduced, and the environment is seriously deteriorated. With the lapse of time, numerous wood products are updated and replaced, resulting in large amounts of waste wood that are either discarded, incinerated, or left unused, so that the waste wood loses the possibility for recycling, and serious resource waste is caused.

With the improvement of the technology, people have begun to reuse such waste wood, and generally, the use of the waste wood means that small blocky waste wood formed by crushing large wood blocks or waste wood preprocessed into thin sheets can be reprocessed into products such as wood flooring, wood board walls, and the like. However, based on technical reasons, the waste wood is rarely applied to manufacturing of heat-insulation building materials, and although a few of the waste wood is applied to the manufacturing of heat-insulation building materials, the building materials manufactured from the waste wood are poor in strength and hardness and poor in modification effect on the waste wood.

The Chinese patent CN 105171866 A provides a method for jointly modifying wood by resin impregnation enhancement, vacuum drying and heat treatment. The method includes the following steps of: (1) resin impregnation enhancement: placing a sheet material in a closed tank and evacuating the tank body to a negative pressure state of 0.08-0.1 MPa, keeping for 20-60 min; then injecting and filling the resin solution in the negative pressure state; adjusting the pressure in the tank body to 0.1-1.0 MPa, and keeping for 1-8 h to inject the resin solution into the wood; releasing the pressure, discharging the remaining resin solution, evacuating the tank body to a negative pressure state of 0.08-0.1 MPa, and keeping for 30-60 min, so as to remove the excess liquid on the surface of the sheet material, and discharging the liquid after the vacuum of the tank body is released; the resin solution is prepared by dissolving melamine urea formaldehyde resin in water, and the volume ratio of the resin to water is 1:4; (2) vacuum drying treatment: stacking the wood treated in step (1) into a vacuum drying tank, heating until the temperature of the wood reaches 40° C.-60° C., then evacuating the heat treatment tank to between-0.04 MPa to-0.06 MPa, maintaining the temperature inside the tank and the vacuum state, and drying the wood to a water content of 5%-12%; (3) early-stage heat treatment: heating the wood in the tank body to 100° C.-130° C., and at the same time, evacuating to a degree of vacuum in the tank body between-0.06 MPa-0.09 MPa, and drying the wood to be absolutely dry; (4) heat treatment: performing heat treatment for 4-10 h at a temperature of 160° C.-240° C., maintaining a degree of vacuum in the tank body between-0.06 MPa and -0.09 MPa; humidifying and cooling the heat-treated wood in sequence, and taking the wood out of the tank. After the wood is modified by the above method, the ultraviolet and infrared shielding functionality is limited, and the manufacturing steps are complicated.

SUMMARY

In view of the above deficiencies present in the prior art, the present application provides a method for manufacturing a transparent heat-insulation building material based on waste wood. The method is simple and easy to practice, and the manufactured densified wood board has good heat-insulation performance, and good application prospect.

In a first aspect, the present application provides the following technical solutions: a method for manufacturing a transparent heat-insulation building material based on waste wood, which includes the following steps of:

step S1, wood pretreatment:
step S1.1, ventilating and drying the waste wood at normal temperature until the water content is 3%-7%;
step S1.2, immersing the dried waste wood in a hydrogen peroxide solution, and heating;
step S1.3, adding a complexing agent solution into the solution obtained in step S1.2, heating, then adding a buffering agent solution, stirring, and reacting for 0.8 h-1.2 h, taking out the reacted wood, washing and drying until the water content is 3%-7%, to obtain the pretreated wood;
step S2, wood acetylation treatment:
step S2.1, loading the pretreated wood into a pressure vessel, and evacuating until a degree of vacuum is 0.75 atm-0.85 atm;
step S2.2, adding acetylation fluid into the pressure vessel, while reducing the pressure of the vessel to the degree of vacuum of less than or equal to 0.7 atm, and keeping for 3-4 h; and
step S2.3, pressurizing the pressure vessel until the gauge pressure is 10 atm, raising the temperature to 100° C.-130° C., and keeping for 1-2 h;
step S3, resin impregnating:
step S3.1, adding 4-6 parts by mass of antimony tin oxide nanoparticles into 25-30 parts by mass of a methyl methacrylate monomer solution, and heating to 75° C.-85° C.; then adding 60-65 parts by mass of methyl methacrylate monomer and 1-2 parts by mass of benzoyl peroxide, stirring and conducting a pre-polymerization reaction to obtain a prepolymer liquid;
step S3.2, bleaching the acetylated wood by hydrogen peroxide, washing, and drying;
step S3.3, placing the wood treated in step S3.2 in a lower chamber of a vacuum permeator, and evacuating;

step S3.4, flowing the prepolymer liquid prepared in step S3.1 in an upper chamber of the vacuum permeator and permeating the prepolymer liquid into the wood in the lower chamber; and step S3.5, collecting the remaining prepolymer liquid, and repeating step S3.4; and step S4, hot press molding:

step S4.1, clamping the permeated wood with a clamping plate, wrapping the wood with an aluminum foil, and polymerizing the wood in an oven at 80° C.-85° C. for 5-6 h; and step S4.2, sleeving the wood treated in step S4.1 into a template of a heat press molding, and pressing for 20-28 h under a pressure of 4-5 MPa at a pressing temperature of 90° C.-100° C. to obtain a densified wood.

Preferably, in step S1.2, the volume ratio of the waste wood to the hydrogen peroxide solution is 1:(2.5-3).

Preferably, step S1.2 includes preparing a 9 wt % hydrogen peroxide solution at 65° C.-80° C., immersing the dried waste wood in the hydrogen peroxide solution, and heating to 85° C.-95° C. and stirring.

Preferably, the volume ratio of the complexing agent, buffering agent and waste wood added in step S1.3 is 0.1:0.5:1.

Preferably, in step S1.3, the complexing agent is 0.1 wt % of magnesium sulfate and 0.1 wt % of diethylenetriamine pentaacetic acid in a volume ratio of 1:1, and the buffering agent is 3.0 wt % sodium silicate and 3.0 wt % sodium hydroxide in a volume ratio of 1:1.

Preferably, in step S2.2, the acetylation fluid includes acetic anhydride, pyridine and N-methylpyrrolidone. In some embodiments, the acetylation fluid is mainly consisted of acetic anhydride, pyridine and N-methylpyrrolidone Preferably, the acetic anhydride, pyridine and N-methylpyrrolidone are mixed in a volume ratio of (6-8):(5-7):100 to provide the acetylation fluid.

Preferably, in step S2.2, the volume ratio of the acetylation fluid to the wood added to the pressure vessel is (1.5-2):1.

In a second aspect, the present application provides the following technical solutions: a method for manufacturing a transparent heat-insulation building material based on waste wood, the method including the following steps of:

step S101, performing decoloring pretreatment to waste wood until a water content of the waste wood is 3%-7%;

step S102, acetylating the wood obtained in step S101;

step S103, immersing the wood obtained in step S102 with a resin containing antimony tin oxide nanoparticles; and step S104, hot press molding the wood obtained in step S103.

In a third aspect, the present application provides a transparent heat-insulation building material, which can be manufactured according to the method of the first or second aspect.

Beneficial effects of the present application are as follow.

The method for retaining lignin is adopted to pretreat the wood, the complete microstructure of the wood is maintained, thereby maintaining features of high strength and high hardness of the transparent wood, and at the same time, the method is more environmentally-friendly and more efficient than the traditional method with lignin removed.

The decolored wood is subjected to acetylation treatment, so that part of hydroxyl groups on the surface of a cell wall is esterified, the surface of the cell wall is hydrophobized, the compatibility with a polymer is improved, and the thickness of the wood is increased while relatively high transparency is still kept;

ATO (antimony doped tin oxide) nanoparticles are added to enhance the ultraviolet infrared shielding capability of wood, and the method has the features of simple operation, low cost, and remarkable performance improvement.

DESCRIPTION OF THE EMBODIMENTS

The present application is described in further detail below by way of specific examples, but the present application is not limited to the following specific examples.

Example 1

A method for manufacturing a transparent heat-insulation building material based on waste wood, which includes the following steps of:

step S1, wood pretreatment:

step S1.1, the waste wood was ventilated and dried at normal temperature until the water content was 5%;

step S1.2, water was introduced into a reaction kettle, the water was heated to 75° C., and held for 10 min, then high-concentration hydrogen peroxide was added to prepare a 9 wt % hydrogen peroxide solution, the dried waste wood was immersed into the prepared hydrogen peroxide solution, heated to 90° C. and stirred; in particular, the volume ratio of waste wood to 9 wt % hydrogen peroxide solution was 1:2.7; and step S1.3, a complexing agent solution was added into the solution obtained in step S1.2, heated, then a buffering agent solution was added, stirred, and reacted for 1.0 h, the reacted wood was taken out, washed and dried until the water content was 5%, to obtain the pretreated wood;

step S2, wood acetylation treatment:

step S2.1, the pretreated wood was loaded into a pressure vessel, and evacuated until a degree of vacuum was 0.8 atm;

step S2.2, acetylation fluid was added into the pressure vessel, the volume ratio of the added acetylation fluid to the volume ratio of wood added to the pressure vessel was 1.8:1, so that the wood was completely immersed, meanwhile, the pressure of the vessel was reduced to the degree of vacuum of less than or equal to 0.6 atm, and kept for 4 h; and step S2.3, the pressure vessel was pressurized until the gauge pressure was 10 atm, the temperature was raised to 120° C., and kept for 1.5 h;

step S3, resin impregnating:

step S3.1, 5 parts by mass of antimony tin oxide nanoparticles were added into 28 parts by mass of a methyl methacrylate monomer solution, and heated to 80° C.; then 63 parts by mass of methyl methacrylate monomer and 2 parts by mass of benzoyl peroxide were added, stirred and a pre-polymerization reaction was conducted to obtain a prepolymer liquid;

step S3.2, the acetylated wood was bleached by hydrogen peroxide, washed, and dried;

step S3.3, the wood treated in step S3.2 was placed in a lower chamber (low-pressure chamber) of the vacuum permeator, and evacuated until the degree of vacuum is 0.5 atm;

step S3.4, the prepolymer liquid prepared in step S3.1 was flowed in an upper chamber (high-pressure chamber) of the vacuum permeator and permeated into the wood in the lower chamber; and step S3.5, the remaining prepolymer liquid was collected, and step S3.4 was repeated; and
step S4, hot press molding:
step S4.1, the permeated wood was clamped with a clamping plate, wrapped with an aluminum foil, and polymerized in an oven at 85° C. for 6 h; and
step S4.2, the wood treated in step S4.1 was sleeved into a template of a heat press molding, and pressed for 25 h under a pressure of 5 MPa at a pressing temperature of 95° C. to obtain a densified wood.

Further, the volume ratio of the complexing agent, buffering agent and waste wood added in step S1.3 was 0.1:0.5:1. The complexing agent was 0.1 wt % of magnesium sulfate and 0.1 wt % of diethylenetriamine pentaacetic acid in a volume ratio of 1:1, and the buffering agent was 3.0 wt % sodium silicate and 3.0 wt % sodium hydroxide in a volume ratio of 1:1.

Further, in step S2.2, the acetylation fluid was mainly consisted of acetic anhydride, pyridine and N-methylpyrrolidone, in which the acetic anhydride, pyridine and N-methylpyrrolidone were mixed in a volume ratio of 7:6:100.

Example 2

A method for manufacturing a transparent heat-insulation building material based on waste wood, which includes the following steps of:
step S1, wood pretreatment:
step S1.1, the waste wood was ventilated and dried at normal temperature until the water content was 3%;
step S1.2, water was introduced into a reaction kettle, the water was heated to 65° C., and held for 10 min, then high-concentration hydrogen peroxide was added to prepare a 9 wt % hydrogen peroxide solution, the dried waste wood was immersed into the prepared hydrogen peroxide solution, heated to 85° C. and stirred; in particular, the volume ratio of waste wood to 9 wt % hydrogen peroxide solution was 1:2.5; and
step S1.3, a complexing agent solution is added into the solution obtained in step S1.2, heated, then a buffering agent solution was added, stirred, and reacted for 0.8 h, the reacted wood was taken out, washed and dried until the water content is 3%, to obtain the pretreated wood;
step S2, wood acetylation treatment:
step S2.1, the pretreated wood was loaded into a pressure vessel, and evacuated until a degree of vacuum was 0.75 atm;
step S2.2, acetylation fluid was added into the pressure vessel, the volume ratio of the added acetylation fluid to the volume ratio of wood added to the pressure vessel is 1.5:1, so that the wood was completely immersed, meanwhile, the pressure of the vessel was reduced to the degree of vacuum of less than or equal to 0.7 atm, and kept for 3 h; and
step S2.3, the pressure vessel was pressurized until the gauge pressure was 10 atm, the temperature was raised to 100° C., and kept for 2 h;
step S3, resin impregnating:
step S3.1, 4 parts by mass of antimony tin oxide nanoparticles were added into 25 parts by mass of a methyl methacrylate monomer solution, and heated to 75° C.; then 60 parts by mass of methyl methacrylate monomer and 1 part by mass of benzoyl peroxide were added, stirred and a pre-polymerization reaction was conducted to obtain a prepolymer liquid;
step S3.2, the acetylated wood was bleached by hydrogen peroxide, washed, and dried;
step S3.3, the wood treated in step S3.2 was placed in a lower chamber (low-pressure chamber) of the vacuum permeator, and evacuated until the degree of vacuum was 0.3 atm;
step S3.4, the prepolymer liquid prepared in step S3.1 was flowed in an upper chamber (high-pressure chamber) of the vacuum permeator and permeated into the wood in the lower chamber; and
step S3.5, the remaining prepolymer liquid was collected, and step S3.4 was repeated;
step S4, hot press molding:
step S4.1, the permeated wood was clamped with a clamping plate, wrapped with an aluminum foil, and polymerized in an oven at 80° C. for 6 h; and
step S4.2, the wood treated in step S4.1 was sleeved into a template of a heat press molding, and pressed for 28 h under a pressure of 4 MPa at a pressing temperature of 90° C. to obtain a densified wood.

Further, the volume ratio of the complexing agent, buffering agent and waste wood added in step S1.3 was 0.1:0.5:1. The complexing agent was 0.1 wt % of magnesium sulfate and 0.1 wt % of diethylenetriamine pentaacetic acid in a volume ratio of 1:1, and the buffering agent was 3.0 wt % sodium silicate and 3.0 wt % sodium hydroxide in a volume ratio of 1:1.

Further, in step S2.2, the acetylation fluid mainly includes acetic anhydride, pyridine and N-methylpyrrolidone; the acetic anhydride, pyridine and N-methylpyrrolidone were mixed in a volume ratio of 6:5:100.

Example 3

A method for manufacturing a transparent heat-insulation building material based on waste wood, which includes the following steps of:
step S1, wood pretreatment:
step S1.1, the waste wood was ventilated and dried at normal temperature until the water content was 7%;
step S1.2, water was introduced into a reaction kettle, the water is heated to 80° C., and held for 10 min, then high-concentration hydrogen peroxide was added to prepare a 9 wt % hydrogen peroxide solution, the dried waste wood was immersed into the prepared hydrogen peroxide solution, heated to 95° C. and stirred; in particular, the volume ratio of waste wood to 9 wt % hydrogen peroxide solution was 1:3; and
step S1.3, a complexing agent solution was added into the solution obtained in step S1.2, heated, then a buffering agent solution was added, stirred, and reacted for 1.2 h, the reacted wood was taken out, washed and dried until the water content is 7%, to obtain the pretreated wood;
step S2, wood acetylation treatment:
step S2.1, the pretreated wood was loaded into a pressure vessel, and evacuated until a degree of vacuum is 0.85 atm;
step S2.2, acetylation fluid was added into the pressure vessel, the volume ratio of the added acetylation fluid to the volume ratio of wood added to the pressure vessel was 2:1, so that the wood is completely immersed, meanwhile, the pressure of the vessel was reduced to the degree of vacuum of less than or equal to 0.7 atm, and kept for 4 h; and
step S2.3, the pressure vessel was pressurized until the gauge pressure was 10 atm, the temperature was raised to 130° C., and kept for 1 h;

step S3, resin impregnating:
step S3.1, 6 parts by mass of antimony tin oxide nanoparticles were added into 30 parts by mass of a methyl methacrylate monomer solution, and heated to 85° C.; then 65 parts by mass of methyl methacrylate monomer and 2 parts by mass of benzoyl peroxide were added, stirred and a pre-polymerization reaction was conducted to obtain a prepolymer liquid;
step S3.2, the acetylated wood was bleached by hydrogen peroxide, washed, and dried;
step S3.3, the wood treated in step S3.2 was placed in a lower chamber (low-pressure chamber) of the vacuum permeator, and evacuated until the degree of vacuum is 0.6 atm;
step S3.4, the prepolymer liquid prepared in step S3.1 was flowed in an upper chamber (high-pressure chamber) of the vacuum permeator and permeated into the wood in the lower chamber; and
step S3.5, the remaining prepolymer liquid was collected, and step S3.4 was repeated; and
step S4, hot press molding:
step S4.1, the permeated wood was clamped with a clamping plate, wrapped with an aluminum foil, and polymerized in an oven at 85° C. for 5 h; and
step S4.2, the wood treated in step S4.1 was sleeved into a template of a heat press molding, and pressed for 20 h under a pressure of 5 MPa at a pressing temperature of 100° C. to obtain a densified wood.

Further, the volume ratio of the complexing agent, buffering agent and waste wood added in step S1.3 was 0.1:0.5:1. The complexing agent was 0.1 wt % of magnesium sulfate and 0.1 wt % of diethylenetriamine pentaacetic acid in a volume ratio of 1:1, and the buffering agent was 3.0 wt % sodium silicate and 3.0 wt % sodium hydroxide in a volume ratio of 1:1.

Further, in step S2.2, the acetylation fluid mainly includes acetic anhydride, pyridine and N-methylpyrrolidone; the acetic anhydride, pyridine and N-methylpyrrolidone were mixed in a volume ratio of 8:7:100.

The above description is only preferred embodiments of the present application and is not intended to limit the protection scope of the present application. All equivalent changes or modifications readily conceivable by a person skilled in the art within the technical scope disclosed in the present application shall be covered by the scope of protection of the present application. Furthermore, the technical solutions between various embodiments of the present application can be combined with each other, but must be realized by a person skilled in the art. When a combination of technical solutions contradicts each other or cannot be realized, it should be considered that the combination of these technical solutions does not exist, nor is it within the scope of protection claimed in the present application. Therefore, the scope of protection of the present application should be defined by the appended claims.

What is claimed is:

1. A method for manufacturing a transparent heat-insulation building material from waste wood, comprising the following steps of:
    step S1, wood pretreatment comprising the following steps:
        step S1.1, ventilating and drying the waste wood until water content is 3%-7% to obtain dried waste wood;
        step S1.2, immersing the dried waste wood in a hydrogen peroxide solution, and heating; and
        step S1.3, adding a complexing agent solution into the hydrogen peroxide solution obtained in the step S1.2, heating, then adding a buffering agent solution, stirring, and reacting for 0.8h-1.2h to obtain reacted wood, taking out the reacted wood, washing and drying the reacted wood until the water content is 3%-7%, to obtain pretreated wood;
    step S2, wood acetylation treatment comprising the following steps:
        step S2.1, loading the pretreated wood into a pressure vessel, and evacuating until a degree of vacuum is 0.75 atm-0.85 atm;
        step S2.2, adding acetylation fluid into the pressure vessel, while reducing pressure of the pressure vessel until the degree of vacuum is less than or equal to 0.7 atm, and keeping for 3-4 h; and
        step S2.3, pressurizing the pressure vessel until gauge pressure is 10 atm, raising the temperature to 100° C.-130° C., and keeping for 1-2h to obtain an acetylated wood;
    step S3, resin impregnating comprising the following steps:
        step S3.1, adding 4-6 parts by mass of antimony tin oxide nanoparticles into 25-30 parts by mass of a methyl methacrylate monomer solution, and heating to 75° C.-85° C.; then adding 60-65 parts by mass of methyl methacrylate monomer and 1-2 parts by mass of benzoyl peroxide, stirring and conducting a pre-polymerization reaction to obtain a prepolymer liquid;
        step S3.2, bleaching the acetylated wood by hydrogen peroxide, washing, and drying;
        step S3.3, placing the acetylated wood treated in the step 3.2 in a lower chamber of a vacuum permeator, and evacuating;
        step S3.4, flowing the prepolymer liquid prepared in the step S3.1 in an upper chamber of the vacuum permeator and permeating the prepolymer liquid into the acetylated wood in the lower chamber to obtain permeated wood; and
        step S3.5, collecting remaining prepolymer liquid, and repeating the step S3.4; and
    step S4, hot press molding comprising the following steps:
        step S4.1, clamping the permeated wood with a clamping plate, wrapping the permeated wood with an aluminum foil, and polymerizing the permeated wood in an oven at 80° C.-85° C. for 5-6 h; and
        step S4.2, sleeving the permeated wood treated in the step S4.1 into a template of a heat press molding, and pressing for 20-28 h under a pressure of 4-5 MPa at a pressing temperature of 90° C.-100° C. to obtain a densified wood.

2. The method for manufacturing the transparent heat-insulation building material from the waste wood according to claim 1, wherein in the step S1.2, a volume ratio of the waste wood to the hydrogen peroxide solution is 1:2.5-1:3.

3. The method for manufacturing the transparent heat-insulation building material from the waste wood according to claim 1, wherein the step S1.2 comprises preparing a 9 wt % hydrogen peroxide solution at 65° C.-80° C. to obtain the hydrogen peroxide solution, immersing the dried waste wood in the hydrogen peroxide solution, and heating to 85° C.-95° C. and stirring.

4. The method for manufacturing the transparent heat-insulation building material from the waste wood according to claim 1, wherein a volume ratio of the complexing agent solution, the buffering agent solution and the dried waste wood added in the step S1.3 is 0.1:0.5:1.

5. The method for manufacturing the transparent heat-insulation building material from the waste wood according to claim 1, wherein in the step S1.3, the complexing agent solution is 0.1 wt % of magnesium sulfate and 0.1 wt % of diethylenetriamine pentaacetic acid in a volume ratio of 1:1, and the buffering agent solution is 3.0 wt % sodium silicate and 3.0 wt % sodium hydroxide in a volume ratio of 1:1.

6. The method for manufacturing the transparent heat-insulation building material from the waste wood according to claim 1, wherein in the step S2.2, the acetylation fluid comprises acetic anhydride, pyridine and N-methylpyrrolidone.

7. The method for manufacturing the transparent heat-insulation building material from the waste wood according to claim 6, wherein the acetic anhydride, the pyridine and the N-methylpyrrolidone are mixed in a volume ratio of 6:5:100-8:7:100 to provide the acetylation fluid.

8. The method for manufacturing the transparent heat-insulation building material from the waste wood according to claim 1, wherein in the step S2.2, avolume ratio of the acetylation fluid to the pretreated wood added to the pressure vessel is 1.5:1-2:1.

\* \* \* \* \*